(12) United States Patent
Suzuki et al.

(10) Patent No.: US 9,312,967 B2
(45) Date of Patent: Apr. 12, 2016

(54) COMMUNICATION DEVICE

(71) Applicant: DENSO CORPORATION, Kariya, Aichi-pref. (JP)

(72) Inventors: Tadao Suzuki, Kariya (JP); Yasumune Yukizaki, Okazaki (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 28 days.

(21) Appl. No.: 14/295,613

(22) Filed: Jun. 4, 2014

(65) Prior Publication Data

US 2014/0364071 A1 Dec. 11, 2014

(30) Foreign Application Priority Data

Jun. 7, 2013 (JP) ................................. 2013-121146

(51) Int. Cl.
| | |
|---|---|
| *H04B 17/00* | (2015.01) |
| *H04B 1/44* | (2006.01) |
| *H04M 9/00* | (2006.01) |
| *H04M 1/00* | (2006.01) |
| *H04B 15/04* | (2006.01) |

(52) U.S. Cl.
CPC ...................................... *H04B 15/04* (2013.01)

(58) Field of Classification Search
CPC ...... H04B 7/0808; H04B 7/0814; H04B 1/54; H04B 1/7183; H04B 3/04; H04B 15/04; H04B 17/318; H04B 2001/485
USPC ........................... 455/67.11, 67.13, 67.7, 132, 455/226.1–226.4, 502, 78, 402, 554.1
See application file for complete search history.

(56) References Cited

U.S. PATENT DOCUMENTS

| | | | | |
|---|---|---|---|---|
| 5,528,621 A | * | 6/1996 | Heiman | G06K 7/0008 375/133 |
| 8,107,915 B2 | * | 1/2012 | Bally | H04B 7/0814 455/277.1 |
| 2002/0025793 A1 | * | 2/2002 | Meijer | H04B 7/0814 455/277.1 |

(Continued)

FOREIGN PATENT DOCUMENTS

| | | |
|---|---|---|
| JP | 02-260928 | 10/1990 |
| JP | 10-276127 | 10/1998 |

(Continued)

OTHER PUBLICATIONS

Office Action dated Jun. 2, 2015 in corresponding Japanese Application No. 2013-121146.

*Primary Examiner* — Simon Nguyen
(74) *Attorney, Agent, or Firm* — Harness, Dickey & Pierce, P.L.C.

(57) ABSTRACT

A communication device includes: a reception antenna; a wireless communication element that synchronizes with a reception signal in an electric wave input from the reception antenna, and receives the reception signal; and a wire communication element connected to the wireless communication element and connected to an external communication device via a communication cable so that the wire communication element transmits a signal to the communication cable. The wire communication element determines whether the wireless communication element synchronizes with the reception signal. When the wire communication element determines that the wireless communication element synchronizes with the reception signal, the wire communication element restricts transmitting the signal to the communication cable.

8 Claims, 7 Drawing Sheets

(56) References Cited

U.S. PATENT DOCUMENTS

| | | | | |
|---|---|---|---|---|
| 2002/0196183 | A1* | 12/2002 | Lindenmeier | H04B 7/0808 342/374 |
| 2004/0048622 | A1* | 3/2004 | Witkowski | G07C 5/008 455/456.6 |
| 2006/0264111 | A1* | 11/2006 | Ohtaki | H03G 3/3068 439/637 |
| 2009/0245425 | A1* | 10/2009 | Tsutsui | H01Q 1/1271 375/319 |
| 2009/0306844 | A1 | 12/2009 | Arita et al. | |
| 2010/0195550 | A1* | 8/2010 | Nakano | H04B 1/0007 370/311 |
| 2011/0028163 | A1 | 2/2011 | Hoshihara et al. | |
| 2011/0269504 | A1 | 11/2011 | Hidaka | |

FOREIGN PATENT DOCUMENTS

| | | |
|---|---|---|
| JP | 2002-050975 | 2/2002 |
| JP | 2004-135162 | 4/2004 |
| JP | 2006-128766 | 5/2006 |
| JP | 2011-234199 | 11/2011 |
| JP | 2011-250108 | 12/2011 |

\* cited by examiner

FRONT ← → REAR

COMMUNICATION DEVICE

CROSS REFERENCE TO RELATED APPLICATION

This application is based on Japanese Patent Application No. 2013-121146 filed on Jun. 7, 2013, the disclosure of which is incorporated herein by reference.

TECHNICAL FIELD

The present disclosure relates to a communication device for receiving an electric wave input from an antenna via a wireless receiving unit and for transmitting the electric wave as a received signal to another device in wired communication manner.

BACKGROUND

Conventionally, JP-A-2011-250108 teaches a technique such that an electric wave input from an antenna is received by a wireless receiving unit so that the wireless receiving unit retrieves a signal from the electric wave, and the signal is transmitted to another device by a wired communication method with an Ethernet (registered trademark) cable or a USB cable.

When the signal is transmitted through a wire, i.e., when the signal is transmitted by a wired communication method, a high frequency noise may radiate so that the high frequency noise negatively affects the wireless receiving unit. For example, if the antenna is arranged near an I/F circuit for a communication cable, the noise generated at the communication cable in case of transmitting the signal may be mixed in the wireless receiving unit, so that the signal receiving sensitivity is reduced.

SUMMARY

It is an object of the present disclosure to provide a communication device having excellent receiving sensitivity.

According to an aspect of the present disclosure, a communication device includes: a reception antenna; a wireless communication element that synchronizes with a reception signal in an electric wave input from the reception antenna, and receives the reception signal; and a wire communication element connected to the wireless communication element and connected to an external communication device via a communication cable so that the wire communication element transmits a signal to the communication cable. The wire communication element determines whether the wireless communication element synchronizes with the reception signal. When the wire communication element determines that the wireless communication element synchronizes with the reception signal, the wire communication element restricts transmitting the signal to the communication cable.

In the above communication device, the wire communication element restricts transmitting the signal to the communication cable when the wireless communication element synchronizes with the reception signal. Thus, while the wireless communication element is receiving the reception signal, a high frequency noise generated at the communication cable is prevented from being input into the reception antenna. Thus, the reception sensitivity is improved.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION (Whole Construction)

Figure 1:
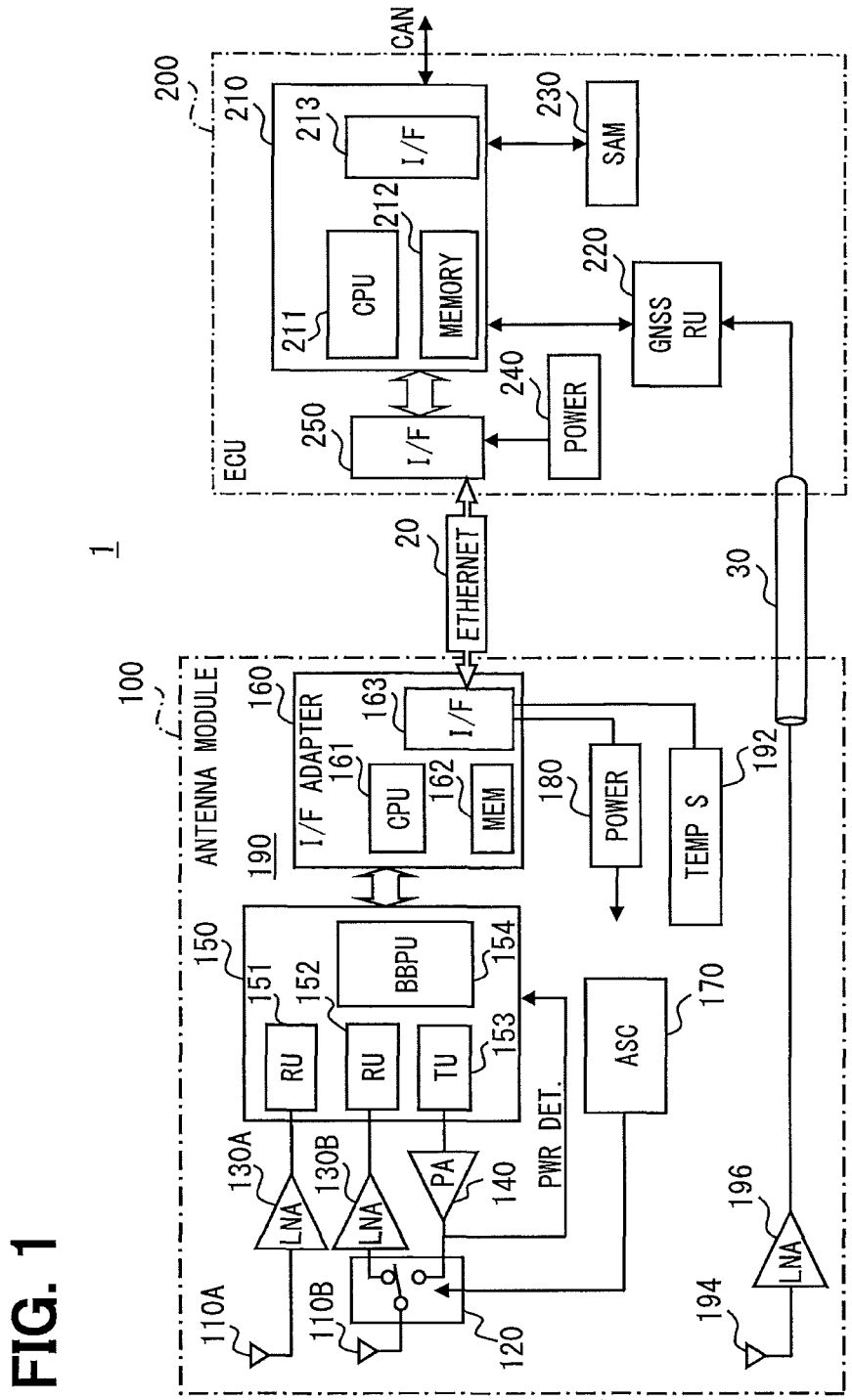
FIG. 1 is a diagram showing a vehicular communication device according to the present embodiment.

An example embodiment of the present disclosure will be explained with reference to the drawings. A vehicular communication device 1 according to a first embodiment of the present disclosure includes an antenna module 100 and a communication ECU (electric control unit), as shown in FIG. 1. The device 1 executes a wireless communication of a vehicle-to-vehicle communication and/or a infrastructure-to-vehicle communication. A communication frequency of the vehicle-to-vehicle communication and the infrastructure-to-vehicle communication is, for example, in a 700 MHz band or a 5.9 GHz band.

Figure 3:
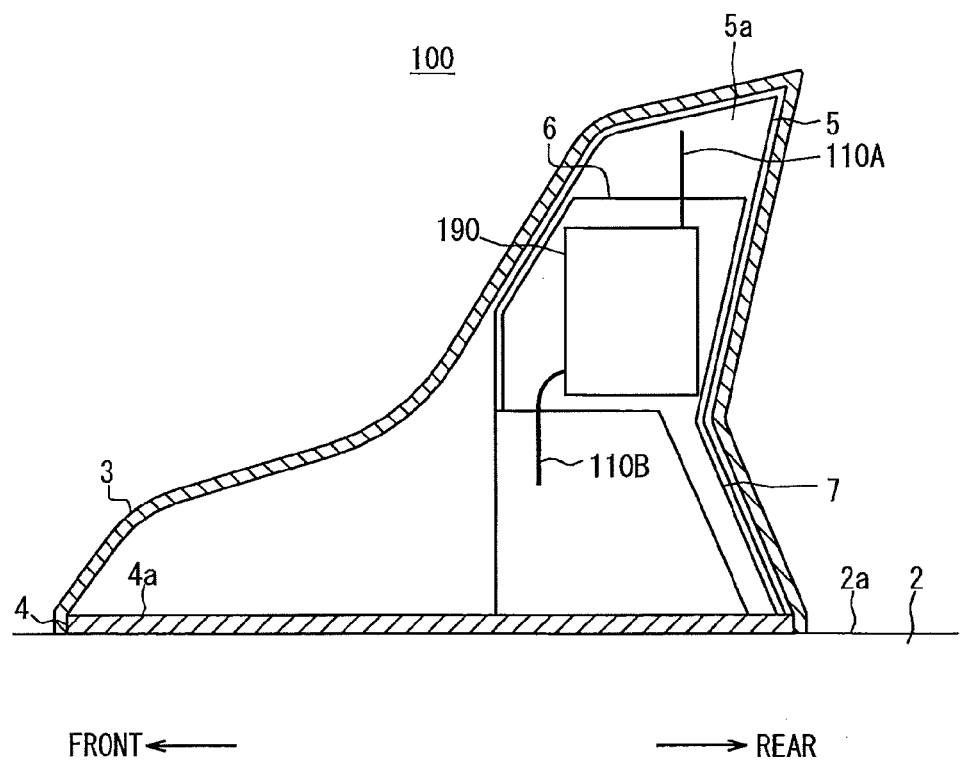
FIG. 3 is a diagram showing a partial cross sectional view of an antenna module on a roof of a vehicle.

In the present embodiment, the antenna module 100 is arranged on a top 2a of a roof 2 of a vehicle, as shown in FIG. 3. On the other hand, the communication ECU 200 is arranged at a certain position in a body of the vehicle. The position, at which the ECU 200 is disposed, is not limited to a specific position as long as the ECU 200 is disposed in the vehicle. Since the ECU 200 includes an electric element, the ECU 200 may be disposed in an environment, at which the temperature change caused by sunshine is small.

(Construction of Antenna Module)

The antenna module 100 provides the vehicle-to-vehicle communication and the infrastructure-to-vehicle communication. As shown in FIG. 1, the module 100 includes two antennas 110A, 110B, a selector switch 120, two low noise amplifiers 130A, 130B, a power amplifier 140, a communication chip 150, an interface adapter 160, a selector circuit 170 and a power source 180. The wireless communication unit 190 is provided by the selector switch 120, two low noise amplifiers 130A, 130B, the power amplifier 140, the communication chip 150, the interface adapter 160, the selector circuit 170 and the power source 180. Thus, the wireless communication unit 190 is provided by the module 100 other than the antenna 110. The wireless communication unit 190 may not be limited to the construction in FIG. 1 as long as the unit 190 has a function for executing the wireless communication.

In addition, the antenna module 100 includes a temperature sensor 192, a GNSS (global navigation satellite system) antenna 194, and a low noise amplifier 196. The GNSS antenna 194 is connected to the low noise amplifier 196, and the low noise amplifier 196 is connected to a coaxial cable 30.

The first antenna 110A of the antenna 110 for the vehicle-to-vehicle communication and the infrastructure-to-vehicle communication executes a receiving function only. The first antenna 110A is connected to the low noise amplifier 130A. On the other hand, the second antenna 110B executes both of the receiving function and a transmitting function. The selector switch 120 switches a connection of the second antenna 110B such that the antenna 110B is connected to the low noise amplifier 130B when receiving an electric wave, and the antenna 110B is connected to the power amplifier 140 when transmitting the electric wave.

The communication chip 150 functions as the wireless receiving unit. The communication chip 150 includes two receiving units 151, 152, a transmitting unit 153 and a base band processing unit 154. In the present embodiment, the vehicle-to-vehicle communication and the infrastructure-to-vehicle communication are performed with communication standards of IEEE 802.11p.

One receiving unit 151 as a first receiving unit is connected to the low noise amplifier 130A, and the other receiving unit 152 as a second receiving unit is connected to the low noise amplifier 130B. When receiving the electric signal, the selector switch 120 switches a connection such that the low noise amplifier 130B coupled with the receiving unit 152 is connected to the antenna 110B. Accordingly, two antennas 110A, 110B are used when receiving the signal. The switching operation of the switch 120 is controlled by the antenna switching circuit 170. These receiving units 151, 152 demodulate the input high frequency signal to obtain a signal in a base band range, and then, the units 151, 152 executes a wave filtration and amplification of the signal. Thus, the units 151, 152 transmit the signal to the base band processing unit 154.

The transmitting unit 153 is connected to the power amplifier 140. When transmitting the signal, the selector switch 120 switches the connection so that the power amplifier 140 and the transmitting unit 153 are connected to the antenna 110B. The transmitting unit 153 modulates the signal from the base band processing unit 154 to obtain the signal in the high frequency band, and then, the unit 153 transmits the signal to the power amplifier 140.

The base band processing unit 154 executes modulation and demodulation of the base band signal. When receiving the signal, a diversity reception is performed. Specifically, in the present embodiment, a maximum ratio combining diversity is performed.

The communication chip 150 is communicable with the interface adapter 160 mutually.

The interface adapter 160 corresponds to a wired communication unit. The adapter 160 includes a CPU 161, a memory 162 and an interface unit (i.e., I/F unit). The I/F unit 163 is connected to the Ethernet cable 20 for executing the communication with Ethernet communication standards. The I/F unit 163 is provided by a hardware and a software. The I/F unit 163 transmits a signal to the Ethernet cable 20 when the CPU 161 allows the transmission of the data.

The CPU 161 communicates with the communication ECU 200 via the Ethernet cable 20 and the I/F unit 163. The signal to be transmitted to the communication ECU 200 includes a digital signal, which is demodulated by the base band processing unit 154. For example, the signal to be transmitted to the communication ECU 200 is a signal, in which a header is added according to a protocol. Further, the CPU 161 controls the communication chip 150.

The selector circuit 170 controls the selector switch 120 to switch the connection according to the communication state of the communication chip 150.

The power source 180 is connected to the interface unit 163. The power source 180 supplies electricity supplied through the Ethernet cable 20 to various elements in the antenna module 100. The temperature sensor 192 is arranged in a casing 3 of the antenna module 100 near the wireless communication unit 190 so as to detect temperature of the wireless communication unit 190, as shown in FIG. 3. The temperature sensor 192 inputs the signal indicative of the detected temperature to the interface unit 163.

(Construction of Communication ECU)

The communication ECU 200 is communicable with the antenna module 100 via the Ethernet cable 20 mutually.

The communication ECU 200 includes a calculating unit 210, a GNSS receiving unit 220, a security access module (SAM) 230, a power source 240 and an interface unit (I/F unit) 250.

The calculating unit 210 includes a CPU 211, a memory 212 and an I/F unit 213. The I/F unit 213 is coupled with a CAN as a communication network in the vehicle. The CPU 211 obtains various information in the vehicle from the CAN via the I/F unit 213. Further, the CPU 211 provides information to devices in the vehicle.

The GNSS receiving unit 220 is connected to the GNSS antenna 194 via the coaxial cable 30. The GNSS receiving unit 220 executes a wave filtration, an amplification and demodulation of the signal supplied from the GNSS antenna 194 so that the unit 220 inputs reception data to the calculating unit 210. The SAM 230 encrypts and decrypts the signal received via the vehicle-to-vehicle communication and the infrastructure-to-vehicle communication and the signal to be transmitted via the vehicle-to-vehicle communication and the infrastructure-to-vehicle communication.

The power source 240 supplies the electricity to various elements in the communication ECU 200. Further, the power source 240 is connected to the I/F unit 250. The I/F unit 250 is connected to the Ethernet cable 20. Thus, the power source 240 supplies the electricity to elements in the antenna module 100 via the I/F unit 250 and the Ethernet cable 20.

(Signal Input into and Output from Calculating Unit)

Figure 2:
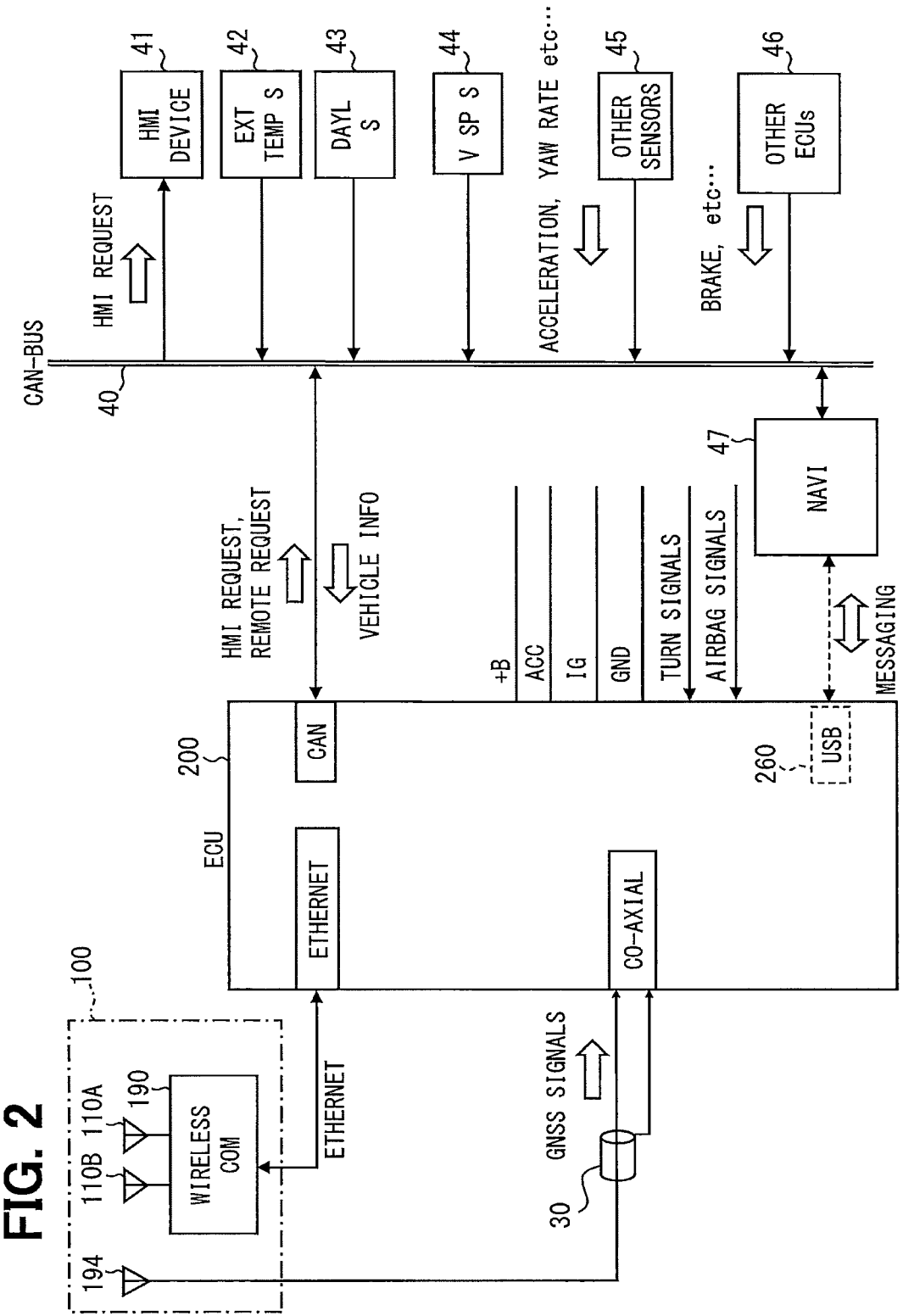
FIG. 2 is a diagram showing a signal input into and output from a communication ECU.

As shown in FIG. 2, a battery power from a battery power source shown as +B, an accessory signal (ACC), an ignition signal (IG), a ground signal (GND), a turn signal indicative of a flashing state of a blinker, and an air bag signal indicative of an inflation state of an air bag are directly input into the communication ECU 200.

The communication ECU 200 outputs a HMI request signal via the CAN bus 40 and obtains various information as vehicle information via the CAN bus 40. The HMI request signal is input into the HMI device 41. The HMI device 41 is, for example, a meter display or the like.

As shown in FIG. 2, the CAN bus 40 is connected to an external temperature sensor 42, a daylight sensor 43, a vehicle speed sensor 44, other sensors 45, ECUs other than the communication ECU 200, and a navigation device 47.

The communication ECU 200 obtains the vehicle information such as the external temperature, the sunlight amount, the vehicle speed, the acceleration, the yaw rate, and the brake signal from the sensors 42-45 and the ECUs 46. A USB connector 260 is arranged on the communication ECU 200. Thus, when the USB is connected to the ECU 200 via the USB connector 260, the communication ECU 200 is communicable with the navigation device 47.

(Vehicle Mounting Position of Antenna Module)

As shown in FIG. 3, the casing 3 provided in the antenna module 100 has a streamline shape such as a shark fin shape in view of an appearance design, so that the streamline shape starts from a vehicle front side and ends to a vehicle rear side.

The ground plate 4 has a rectangular planar shape and made of metal plate. When the antenna module 100 is mounted on the top 2a of the roof 2, the ground plate 4 is arranged along the top 2a of the roof 2. A printed circuit board 5 is arranged on a ground plate surface 4a as a top surface of the ground plate 4 such that the board 5 is perpendicular to the ground plate surface 4a. The printed circuit board 5 is made of resin, and has a flat plate shape.

The antenna ground 6 is formed on one side 5a of the board 5, and is made of a conductor land pattern such as a conductive film. A connection unit 7 connects electrically between the antenna ground 6 and the ground plate 4, and is made of a conductor land pattern. The connection unit 7 provides the same electric potential between the antenna ground 6 and the ground plate 4.

The wireless communication unit 190 is fixed on a surface 5a of the printed circuit board 5, on which the antenna ground 6 is disposed. Further, the antennas 110A, 110B are also fixed to the board 5.

Although not shown in FIG. 3, the wireless communication unit 190 includes the I/F unit 163. Accordingly, the I/F unit 163 and the antennas 110A, 110B are arranged in the same casing 3 of the antenna module 100 such that the I/F unit 163 and the antennas 110A, 110B are adjacent to each other.

(Receiving Process of Base Band Processing Unit)

The receiving process executed by the base band processing unit 154 synchronizes with using a preamble, which is arranged at a head of a frame. Under a condition that the synchronized state is kept, the unit 154 executes the reception of the frame. When the frame ends, the unit 154 stops keeping the synchronized state.

Figure 4:
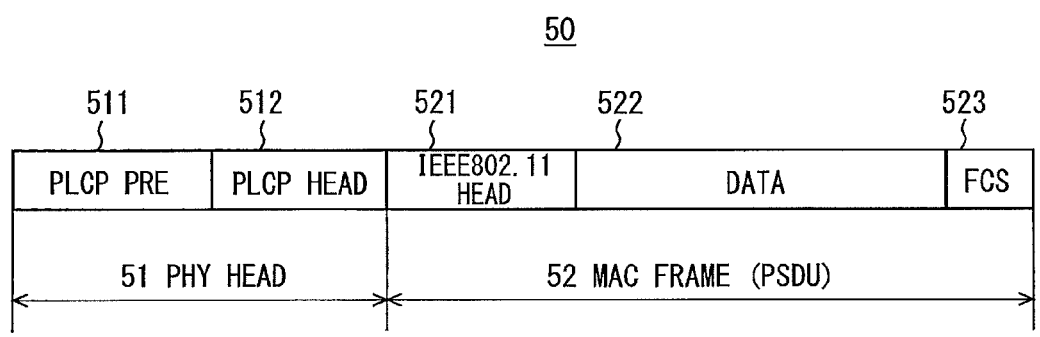
FIG. 4 is a diagram showing a frame format.

FIG. 4 shows an example of a frame format 50. Specifically, the frame format 50 is defined by the standards of IEEE 802.11. The frame format 50 in FIG. 4 includes a physical header 51 and a MAC frame 52. The physical header 51 includes a PLCP preamble 511 and a PLCP header 512. The MAC frame 52 includes a IEEE 802.11 header 521, data 522 and FCS 523.

(Process of CPU in Antenna Module)

The CPU 161 as an antenna module CPU 161 in the interface adapter 160 of the antenna module 100 transmits the signal obtained from the communication chip 150 to the Ethernet cable 20 and the I/F unit 163. Further, the CPU 161 instructs the I/F unit 163 to permit the transmission and to stop the transmission of a signal to be transmitted to the Ethernet cable 20.

Figure 5:
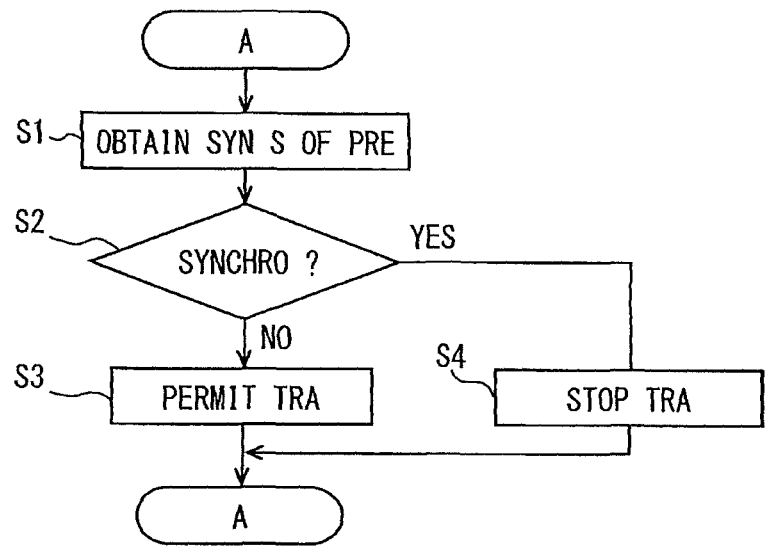
FIG. 5 is a flowchart showing a process executed by a CPU of the antenna module according to a first embodiment.

In the first embodiment, in the process in FIG. 5, the permission of the transmission and the stoppage of the transmission of the signal to the Ethernet cable 50 are set. The process in FIG. 5 is executed when the I/F unit 163 starts to transmit the signal to the Ethernet cable 20. Alternatively, the process in FIG. 5 is executed with a predetermined execution period.

At step S1, the preamble synchronization state of the received signal is obtained from the base band processing unit 154.

At step S2, the CPU 161 determines based on the synchronization state obtained at step S1 whether the synchronization is established. When the synchronization state is not established, i.e., when the determination at step S2 is "NO," it goes to step S3. At step S3, the CPU 161 instructs the I/F unit 163 to permit the transmission to the Ethernet cable 20. When the synchronization state is established, i.e., when the determination at step S2 is "YES," it goes to step S4. At step S4, the CPU 161 instructs the I/F unit 163 to stop the transmission to the Ethernet cable 20.

Under a condition that the signal is transmitted to the communication ECU 200 via the Ethernet cable 20, a high frequency noise may radiate from the Ethernet cable 20. Further, in the present embodiment, the I/F unit 163 and the antennas 110A, 110B are adjacent to each other. Accordingly, the high frequency noise radiated from the Ethernet cable 20 may penetrate into the antennas 110A, 110B.

If the high frequency noise is input into the antennas 110A, 110B when the signal is received by the communication chip 150, the communication chip 150 may not receive the proper signal.

Thus, in the first embodiment, at step S1, the CPU 161 obtains the synchronization state from the base band processing unit 156. When the synchronization is established, i.e., when the communication chip 150 receives the signal, the CPU 161 stops transmitting the signal through the Ethernet cable 20 at step S4. Thus, when the communication chip 150 receives the signal, the possibility of inputting the high frequency noise, which is generated from the Ethernet cable 20, to the antennas 110A, 110B is reduced. Thus, a possibility of retrieving the proper base band signal from the received signal is improved. Thus, the reception sensitivity is improved.

(Second Embodiment)

A second embodiment will be explained as follows.

Figure 6:
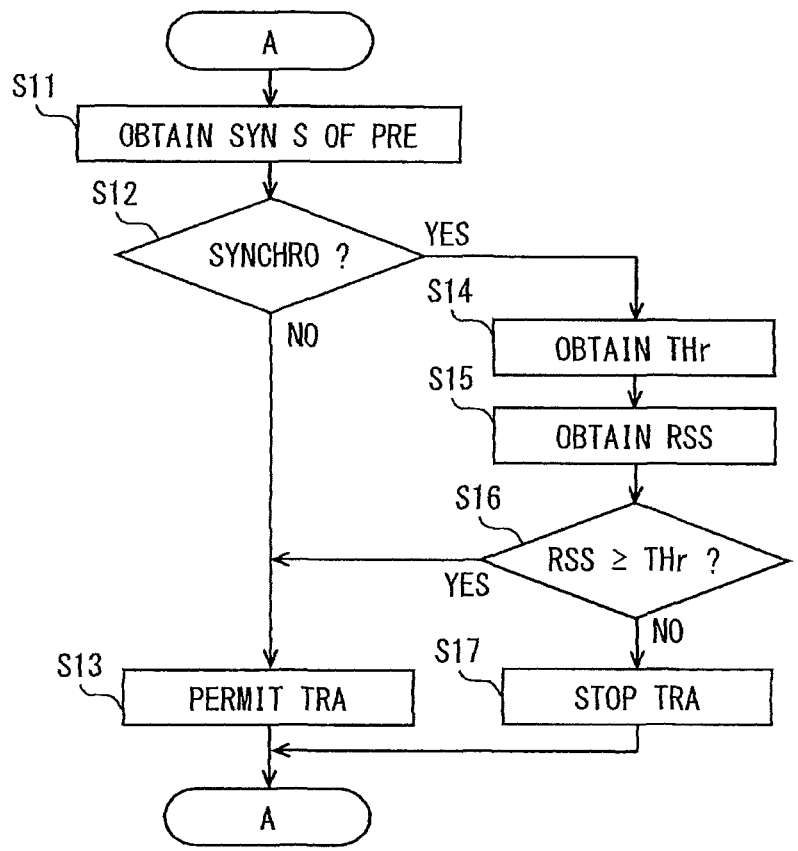
FIG. 6 is a flowchart showing a process executed by the CPU of the antenna module according to a second embodiment.

In the second embodiment, the process shown in FIG. 6 is executed, instead of FIG. 5. Further, in the second embodiment, the memory 162 stores a RSS threshold THr, which corresponds to a signal intensity threshold, in order to compare with a received signal strength (RSS). The RSS threshold THr is preliminarily set based on an experiment.

In FIG. 6, steps S11, S12, S13 are the same as steps S1, S2, S3.

At step S12, when the synchronization state is established, i.e., when the determination at step S12 is "YES," the following steps S14-S16 are different from the first embodiment. Specifically, when the determination at step S12 is "YES," it goes to step S14.

At step S14, the CPU 161 reads out the RSS threshold THr from the memory 162. Then, at step S15, the CPU 161 obtains the received signal strength RSS from the base band processing unit 154.

At step S16, the CPU 161 determines whether the received signal strength RSS obtained at step S15 is equal to or larger than the RSS threshold THr obtained at step S14. When the received signal strength RSS is equal to or larger than the RSS threshold THr, i.e., when the determination at step S16 is "YES," it goes to step S13. At step S13, the CPU 161 permits the transmission of the signal to the Ethernet cable 20.

When the determination at step S16 is "NO," i.e., when the received signal strength RSS is smaller than the RSS threshold THr, it goes to step S17. At step S17, the CPU 161 instructs the I/F unit 163 to stop transmitting to the Ethernet cable 20.

In the second embodiment, even when the base band processing unit 154 establishes the synchronization, the CPU 161 permits the transmission to the Ethernet cable 20 in a case where the received signal strength RSS is equal to or larger than the RSS threshold THr. This is because the reduction of the signal reception sensitivity caused by the noise is not dominant if the received signal strength RSS is equal to or larger than the RSS threshold THr.

Thus, the possibility of retrieving the proper base band signal from the received signal is improved, and further, the time interval to stop transmitting through the Ethernet cable 20 is shortened.

(Third Embodiment)

Figure 7:
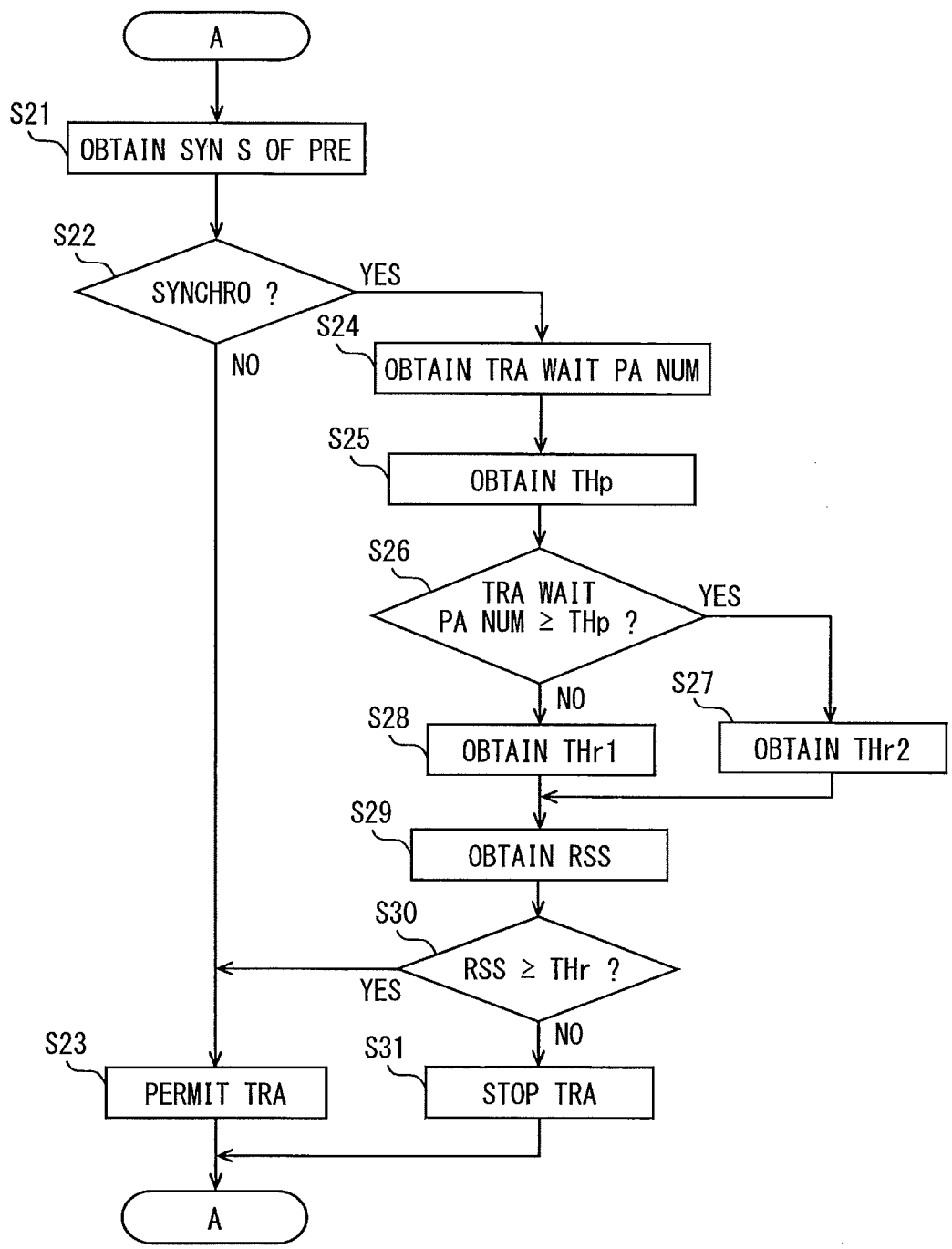
FIG. 7 is a flowchart showing a process executed by the CPU of the antenna module according to a third embodiment.

In the third embodiment, the process shown in FIG. 7 is executed, instead of FIG. 5. Further, in the third embodiment, the memory 162 stores two RSS thresholds THr1, THr2, which are different from each other. The magnitude of the RSS thresholds THr1, THr2 is shown that the first RSS threshold THr1 is larger than the second RSS threshold THr2 (i.e., THr1>THr2). Further, the memory 162 stores a threshold THp for the number of transmission waiting packets. These thresholds THr1, THr2, THp as a waiting packet threshold are preliminarily set based on the experiment.

In FIG. 7, steps S21, S22, S23 are the same as steps S1, S2, S3.

When the determination at step S22 is "YES," the following steps S24-S30 are different from the first embodiment. Specifically, when the determination at step S22 is "YES," i.e., when the synchronization state is established, it goes to step S24.

At step S24, the CPU 161 obtains the number of transmission waiting packets, which is stored in an Ethernet transmission queue, from the I/F unit 163. Then, at step S25, the CPU 161 obtains the waiting packet threshold THp from the memory 162.

At step S26, the CPU 161 determines whether the number of transmission waiting packets obtained at step S24 is equal to or larger than the waiting packet threshold THp obtained at step S25. When the number of transmission waiting packets is equal to or larger than the waiting packet threshold THp, i.e., when the determination at step S26 is "YES," it goes to step S27. At step S27, the CPU 161 obtains the second RSS threshold THr2, which is smaller one of two thresholds THr1, THr2.

When the determination at step S26 is "NO," i.e., when the number of transmission waiting packets is smaller than the waiting packet threshold THp, it goes to step S28. At step S28, the CPU 161 obtains the first RSS threshold THr1, which is larger one of two thresholds THr1, THr2.

After step S27, S28 is executed, it goes to step S29. At step S29, the CPU 161 obtains the received signal strength RSS from the base band processing unit 154. At step S30, the CPU 161 determines whether the received signal strength RSS obtained at step S29 is equal to or larger than the RSS threshold THr, which corresponds to the first RSS threshold THr1 obtained at step S28 or the second RSS threshold THr2 obtained at step S27. When the received signal strength RSS is equal to or larger than the RSS threshold THr, i.e., when the determination at step S30 is "YES," it goes to step S23. At step S23, the CPU 161 permits the transmission of the signal to the Ethernet cable 20.

When the determination at step S30 is "NO," i.e., when the received signal strength RSS is smaller than the RSS threshold THr, it goes to step S31. At step S31, the CPU 161 instructs the I/F unit 163 to stop transmitting to the Ethernet cable 20.

In the third embodiment, similar to the second embodiment, the CPU 161 compares the received signal strength RSS with the RSS threshold THr, so that the CPU 161 switches between the permission of the transmission and the stoppage of the transmission to the Ethernet cable 20 at steps S23 and S29-S31. In addition, the RSS threshold THr includes two different RSS thresholds THr1, THr2, which have different magnitudes. When the transmission waiting packet number is large, i.e., when the determination at step S26 is "YES," the CPU 161 selects the small one, i.e., the second RSS threshold THr2 at step S27.

Thus, the possibility of retrieving the proper base band signal from the received signal is improved, and the number of transmission waiting packets to be transmitted to the Ethernet cable 20 is restricted to be small.

(Fourth Embodiment)

Figure 8:
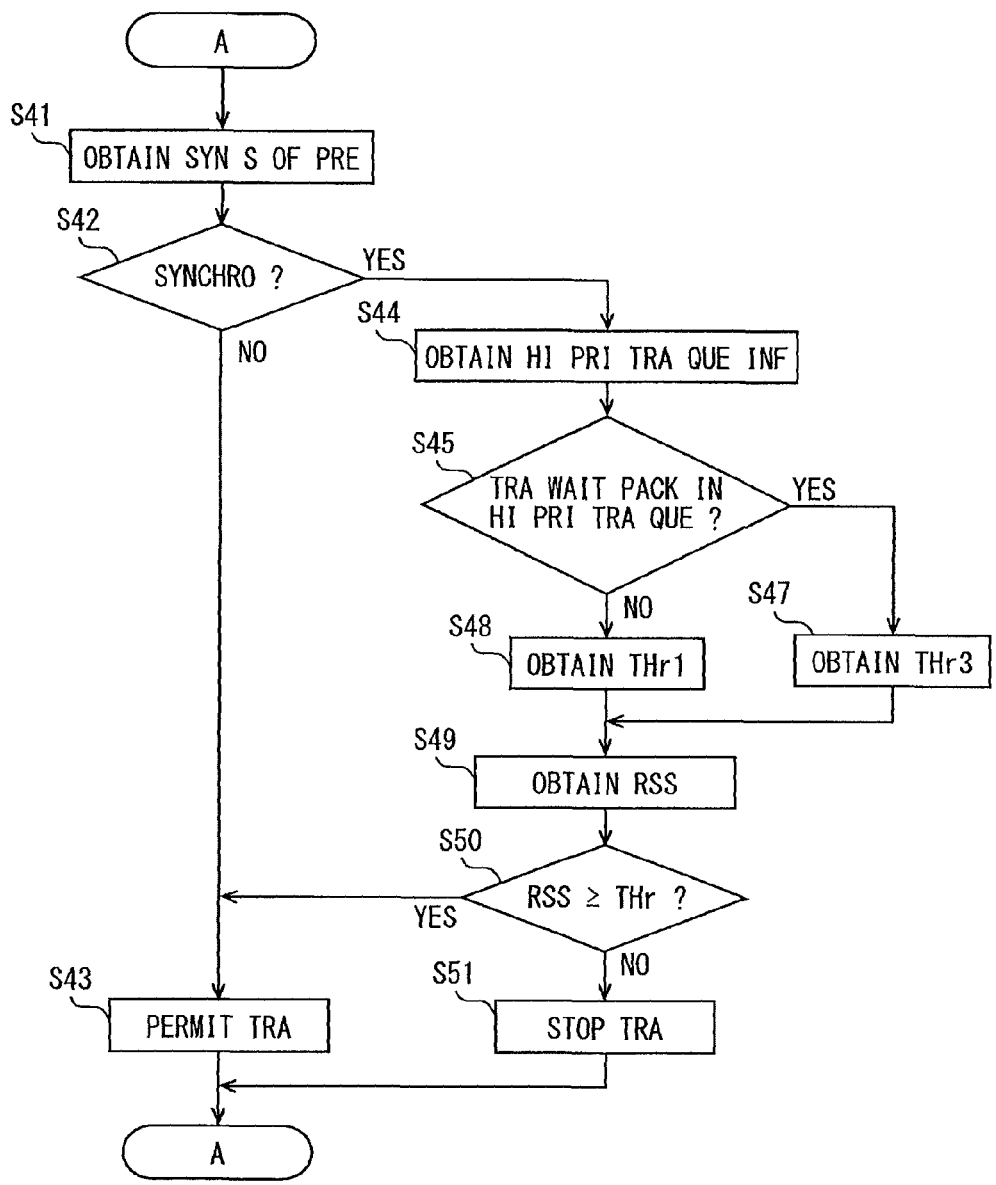
FIG. 8 is a flowchart showing a process executed by the CPU of the antenna module according to a fourth embodiment.

In the fourth embodiment, the process shown in FIG. 8 is executed, instead of FIG. 5. Further, in the fourth embodiment, the memory 162 stores two RSS thresholds THr1, THr3, which are different from each other. The magnitude of the RSS thresholds THr1, THr3 is shown that the first RSS threshold THr1 is larger than the third RSS threshold THr3 (i.e., THr1>THr3).

In the fourth embodiment, the priority of the transmission queue is set. The priority of the transmission queue is determined by the Ethernet frame transmitted from the antenna module CPU 161 to the I/F unit 163. The priority is shown in a predetermined field or a predetermined bit in the Ethernet frame.

In FIG. 8, steps S41, S42, S43 are the same as steps S1, S2, S3.

When the determination at step S42 is "YES," i.e., when the synchronization state is established, it goes to step S44. At step S44, the CPU 161 obtains the high priority transmission queue information from the I/F unit 163. The high priority transmission queue information indicates a state whether the transmission waiting packet is stored in the high priority transmission queue among the Ethernet transmission queues. Here, when the priority includes three priority levels or more, it is determined preliminarily which one of priority levels is the highest priority. When the priority includes three priority levels or more, only the highest priority level may be determined as high priority. Alternatively, multiple higher priority levels may be determined as high priority.

At step S45, the CPU 161 determines whether the high priority transmission queue includes the transmission waiting packet. When the determination at step S45 is "YES," i.e., when the high priority transmission queue includes the transmission waiting packet, it goes to step S47. At step S47, the CPU 161 obtains the third RSS threshold THr3, which is smaller one of two thresholds THr1, THr3.

When the determination at step S45 is "NO," i.e., when the high priority transmission queue does not include the transmission waiting packet, it goes to step S48. At step S48, the CPU 161 obtains the first RSS threshold THr1, which is larger one of two thresholds THr1, THr3.

After step S48, S48 is executed, it goes to step S49. Steps S49, S50, S51 are the same as steps S29, S30, S31. Accordingly, when the received signal strength RSS is equal to or larger than the RSS threshold THr, which corresponds to the first RSS threshold THr1 or the third RSS threshold THr3, i.e., when the determination at step S50 is "YES," it goes to step S43. At step S43, the CPU 161 permits the transmission of the signal to the Ethernet cable 20. When the received signal strength RSS is smaller than the RSS threshold THr, i.e., when the determination at step S50 is "NO," it goes to step S51. At step S51, the CPU 161 instructs the I/F unit 163 to stop transmitting to the Ethernet cable 20.

In the fourth embodiment, similar to the second and third embodiments, the CPU 161 compares the received signal strength RSS with the RSS threshold THr, so that the CPU 161 switches between the permission of the transmission and the stoppage of the transmission to the Ethernet cable 20 at steps S43 and S49-S51. In addition, the RSS threshold THr includes two different RSS thresholds THr1, THr3, which have different magnitudes. When the high priority transmission queue includes the transmission waiting packet, when the determination at step S45 is "YES," the CPU 161 selects the small one, i.e., the third RSS threshold THr3 at step S47.

Thus, the possibility of retrieving the proper base band signal from the received signal is improved, and the delay of transmitting the high priority signal to the Ethernet cable 20 is restricted to be small.

(Fifth Embodiment)

Figure 9:
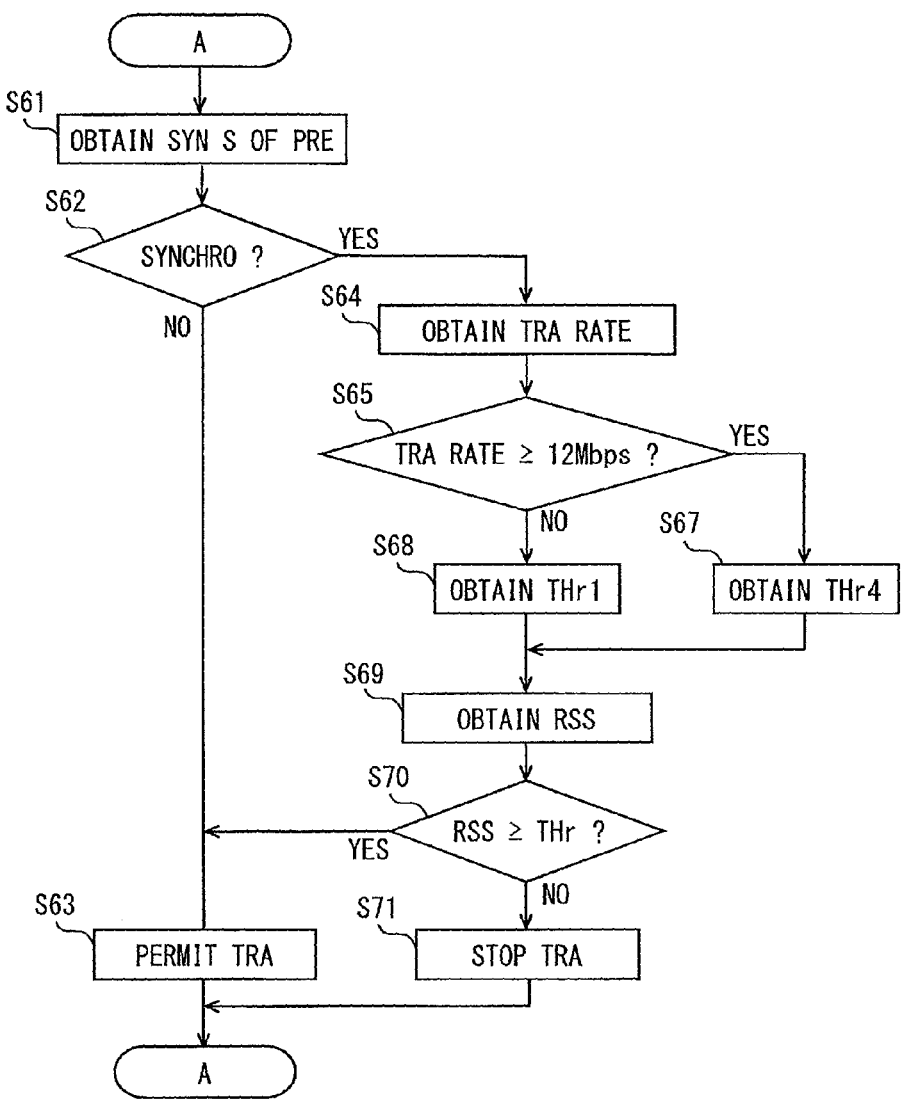
FIG. 9 is a flowchart showing a process executed by the CPU of the antenna module according to a fifth embodiment.

In the fifth embodiment, the process shown in FIG. 9 is executed, instead of FIG. 5. Further, in the fifth embodiment, the memory 162 stores two RSS thresholds THr1, THr4, which are different from each other. The magnitude of the RSS thresholds THr1, THr4 is shown that the first RSS threshold THr1 is smaller than the fourth RSS threshold THr4 (i.e., THr1<THr4).

In FIG. 9, steps S61, S62, S63 are the same as steps S1, S2, S3.

When the determination at step S62 is "YES," i.e., when the synchronization state is established, it goes to step S64. At step S64, the CPU 161 obtains the transmission rate of the received signal from the base band processing unit 154. In the present embodiment, the transmission rate of the received signal is shown in the PLCP header 512.

At step S65, the CPU 161 determines whether the transmission rate of the received signal is equal to or larger than 12 Mbps. The threshold of 12 Mbps is set in order to determine whether the transmission rate is high, i.e., fast. The threshold of 12 Mbps is merely an example. Therefore, the threshold may be set differently. When the determination at step S65 is "YES," i.e., when the transmission rate of the received signal is equal to or larger than 12 Mbps, it goes to step S67. At step S67, the CPU 161 obtains the fourth RSS threshold THr4, which is larger one of two thresholds THr1, THr4.

When the determination at step S65 is "NO," i.e., when the transmission rate of the received signal is smaller than 12 Mbps, it goes to step S68. At step S68, the CPU 161 obtains the first RSS threshold THr1, which is smaller one of two thresholds THr1, THr4.

After step S67, S68 is executed, it goes to step S69. Steps S69, S70, S71 are the same as steps S29, S30, 31. Thus, when the received signal strength RSS is equal to or larger than the RSS threshold THr, i.e., when the determination at step S70 is "YES," the CPU 161 permits the transmission of the signal to the Ethernet cable 20 at step S63. When the determination at step S70 is "NO," i.e., when the received signal strength RSS is smaller than the RSS threshold THr, the CPU 161 instructs the I/F unit 163 to stop transmitting to the Ethernet cable 20 at step S71.

In the fifth embodiment, similar to the second to fourth embodiments, the CPU 161 compares the received signal strength RSS with the RSS threshold THr, so that the CPU 161 switches between the permission of the transmission and the stoppage of the transmission to the Ethernet cable 20 at steps S63 and S69-S71. In addition, the RSS threshold THr includes two different RSS thresholds THr1, THr4, which have different magnitudes. When the transmission rate of the received signal is equal to or larger than 12 Mbps, i.e., when the determination at step S65 is "YES," the CPU 161 selects the large one, i.e., the fourth RSS threshold THr4 at step S67.

When the transmission rate is high, the noise may affect the antennas 110A, 110B. Thus, in the fifth embodiment, when the transmission ate is high, i.e., when the determination at step S65 is "YES," at step S67, the CPU 161 obtains the fourth RSS threshold THr4, which is larger one of two thresholds THr1, THr4 than a case where the transmission rate is low. Thus, the possibility of retrieving the proper base band signal from the received signal is improved.

In the above embodiments, the antenna module 100 includes two antennas 110A, 110B in order to execute the reception diversity in the vehicle-to-vehicle communication and the infrastructure-to-vehicle communication. Alternatively, only one antenna may be used for the vehicle-to-vehicle communication and the infrastructure-to-vehicle communication. Alternatively, three or more antennas may be used for the vehicle-to-vehicle communication and the infrastructure-to-vehicle communication.

In the above embodiments, the wire communication is performed by the Ethernet protocol. Alternatively, the wire communication may be performed by other protocols. In this case, another communication cable may be used for the wire communication, instead of the Ethernet cable 20.

In the third embodiment, the RSS threshold Thr includes two different RSS thresholds THr1, THr2. One of two RSS thresholds Thr1, THr2 corresponds to a case where the number of transmission waiting packets is large (i.e., a case where the determination at step S26 is "YES"), and the other of two RSS thresholds THr1, THr2 corresponds to a case where the number of transmission waiting packets is small (i.e., a case where the determination at step S26 is "NO").

Alternatively, the RSS threshold Thr may include three or more different RSS thresholds. As the RSS threshold is small, the RSS threshold may correspond to the large number of transmission waiting packets. Further, the level of the number of transmission waiting packets may be determined by multiple waiting packet thresholds THp, so that the received signal threshold determined by the level of the number of transmission waiting packets is set, and then, the process in step S30 is performed.

In the fourth embodiment, the RSS threshold Thr includes two different RSS thresholds THr1, THr3. One of two RSS thresholds Thr1, THr3 corresponds to a case where the high priority transmission queue includes the transmission waiting packet (i.e., a case where the determination at step S45 is "YES"), and the other of two RSS thresholds THr1, THr3 corresponds to a case where the high priority transmission queue does not include the transmission waiting packet (i.e., a case where the determination at step S45 is "NO").

Alternatively, when the priority of the transmission queue includes three or more levels, the RSS threshold Thr may include three or more different RSS thresholds. Here, the number of RSS thresholds is equal to or smaller than the number of levels of the priority of the transmission queue. As the RSS threshold is small, the RSS threshold may correspond to the high level of the priority of the transmission queue. When the transmission queue includes the transmission waiting packet, the received signal threshold determined by the priority of the transmission queue, in which the transmission waiting packet is stored, is set, and then, the process in step S50 is performed.

In the fifth embodiment, the RSS threshold Thr includes two different RSS thresholds THr1, THr4. One of two RSS thresholds Thr1, THr4 corresponds to a case where the transmission rate of the received signal is high (i.e., a case where the determination at step S65 is "YES"), and the other of two RSS thresholds THr1, THr4 corresponds to a case where the transmission rate of the received signal is low (i.e., a case where the determination at step S65 is "NO").

Alternatively, the RSS threshold Thr may include three or more different RSS thresholds. As the RSS threshold is small, the RSS threshold may correspond to the low transmission rate. That is, the higher the transmission rate, the higher the RSS threshold. The received signal threshold determined by the transmission rate of the received signal is set, and then, the process in step S70 is performed. Since the RSS threshold increases with the transmission rate, the CPU 161 does not allows the transmission to the Ethernet cable 20 unless the received signal strength RSS is high when the transmission rate is high, i.e., when the influence of the noise is high. Thus, the restriction to the reception sensitivity is improved.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device, module or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A communication device comprising:
a reception antenna;
a wireless communication element that synchronizes with a reception signal in an electric wave input from the reception antenna, and receives the reception signal; and
a wire communication element connected to the wireless communication element and connected to an external communication device via a communication cable so that the wire communication element transmits a signal to the communication cable;
wherein the wire communication element determines whether the wireless communication element synchronizes with the reception signal,
wherein, when the wire communication element determines that the wireless communication element synchronizes with the reception signal, the wire communication element restricts transmitting the signal to the communication cable;
wherein, when the wire communication element determines that the wireless communication element synchronizes with the reception signal, and further, a reception signal intensity of the reception signal is lower than a predetermined signal intensity threshold, the wire communication element restricts transmitting the signal to the communication cable;
wherein the predetermined signal intensity threshold includes a plurality of signal intensity threshold values, which are different from each other,
wherein the wire communication element sets one of the signal intensity threshold values according to a numerical number of transmission waiting packets,
wherein the smaller the signal intensity threshold values, the larger the numerical number of transmission waiting packets, and
wherein the wire communication element determines whether the reception signal intensity of the reception signal is lower than the one of the signal intensity threshold values, which is set by the wire communication element.

2. The communication device according to claim 1,
wherein the signal to be transmitted by the wire communication element corresponds to the reception signal, and
wherein the wire communication element restricts transmitting the signal to the communication cable so that the wire communication element stops transmitting the signal to the communication cable.

3. The communication device according to claim 1,
wherein the transmission waiting packets are stored in the wire communication element until the wire communication element transmits the transmission waiting packets as the signal to the communication cable.

4. The communication device according to claim 1,
wherein the reception antenna, the wireless communication element and the wire communication element provide a module.

5. The communication device according to claim 1,
wherein information presented in the signal to be transmitted to the external communication device is provided by the reception signal of the wireless communication element.

6. A communication device comprising:
a reception antenna;
a wireless communication element that synchronizes with a reception signal in an electric wave input from the reception antenna, and receives the reception signal; and
a wire communication element connected to the wireless communication element and connected to an external communication device via a communication cable so that the wire communication element transmits a signal to the communication cable;
wherein the wire communication element determines whether the wireless communication element synchronizes with the reception signal,
wherein, when the wire communication element determines that the wireless communication element synchronizes with the reception signal, the wire communication element restricts transmitting the signal to the communication cable;
wherein, when the wire communication element determines that the wireless communication element synchronizes with the reception signal, and further, a reception signal intensity of the reception signal is lower than a predetermined signal intensity threshold, the wire communication element restricts transmitting the signal to the communication cable;
wherein the predetermined signal intensity threshold includes a plurality of signal intensity threshold values, which are different from each other,
wherein the wire communication element sets one of the signal intensity threshold values according to a priority of a transmission queue when the transmission queue includes a transmission waiting packet,
wherein the smaller the signal intensity threshold values, the higher the priority of the transmission queue, and
wherein the wire communication element determines whether the reception signal intensity of the reception signal is lower than the one of the signal intensity threshold values, which is set by the wire communication element.

7. The communication device according to claim 6,
wherein the transmission waiting packet is stored in the transmission queue of the wire communication element until the wire communication element transmits the transmission waiting packet as the signal to the communication cable, and
wherein the priority of the transmission queue relates to a transmission priority of the transmission queue.

8. A communication device comprising:
a reception antenna;
a wireless communication element that synchronizes with a reception signal in an electric wave input from the reception antenna, and receives the reception signal; and
a wire communication element connected to the wireless communication element and connected to an external communication device via a communication cable so that the wire communication element transmits a signal to the communication cable;

wherein the wire communication element determines whether the wireless communication element synchronizes with the reception signal, wherein, when the wire communication element determines that the wireless communication element synchronizes with the reception signal, the wire communication element restricts transmitting the signal to the communication cable;

wherein, when the wire communication element determines that the wireless communication element synchronizes with the reception signal, and further, a reception signal intensity of the reception signal is lower than a predetermined signal intensity threshold, the wire communication element restricts transmitting the signal to the communication cable;

wherein the predetermined signal intensity threshold includes a plurality of signal intensity threshold values, which are different from each other, wherein the wire communication element sets one of the signal intensity threshold values according to a transmission rate of the reception signal, which is received by the wireless communication element, wherein the smaller the signal intensity threshold values, the lower the transmission rate, and wherein the wire communication element determines whether the reception signal intensity of the reception signal is lower than the one of the signal intensity threshold values, which is set by the wire communication element.

* * * * *